United States Patent [19]

Lagarde et al.

[11] 4,045,618

[45] Aug. 30, 1977

[54] DEVICE FOR SYNCHRONIZING A BINARY DATA TRAIN IN RELATION TO A REFERENCE TRAIN

[75] Inventors: Jean-Louis Lagarde, Arpajon; Gilles Gauriat, Paris, both of France

[73] Assignee: Compagnie Industrielle des Telecommunications CIT-ALCATEL S.A.

[21] Appl. No.: 653,637

[22] Filed: Jan. 29, 1976

[51] Int. Cl.² .......................... H04L 7/00; H04J 3/06
[52] U.S. Cl. ................................. 179/15 BS; 178/69.1
[58] Field of Search ...................... 179/15 BS, 15 AF; 178/69.5 R

[56] References Cited

U.S. PATENT DOCUMENTS

| | | | |
|---|---|---|---|
| 3,575,557 | 4/1971 | McConen | 179/15 AF |
| 3,867,579 | 2/1975 | Colton | 179/15 BS |

Primary Examiner—David L. Stewart

[57] ABSTRACT

The invention comes within the field of digital transmission and concerns the synchronization of two bit trains in relation to the beginning of a frame. According to the invention, one of the trains crosses a memory of the FIFO type, whose writing speed corresponds to the frequency of that train and whose reading is controlled by a detector of the locking word in that frame and by a signal indicating the synchronization of the two trains. Application: digital PCM terminals comprising thirty telephone channels.

2 Claims, 1 Drawing Figure

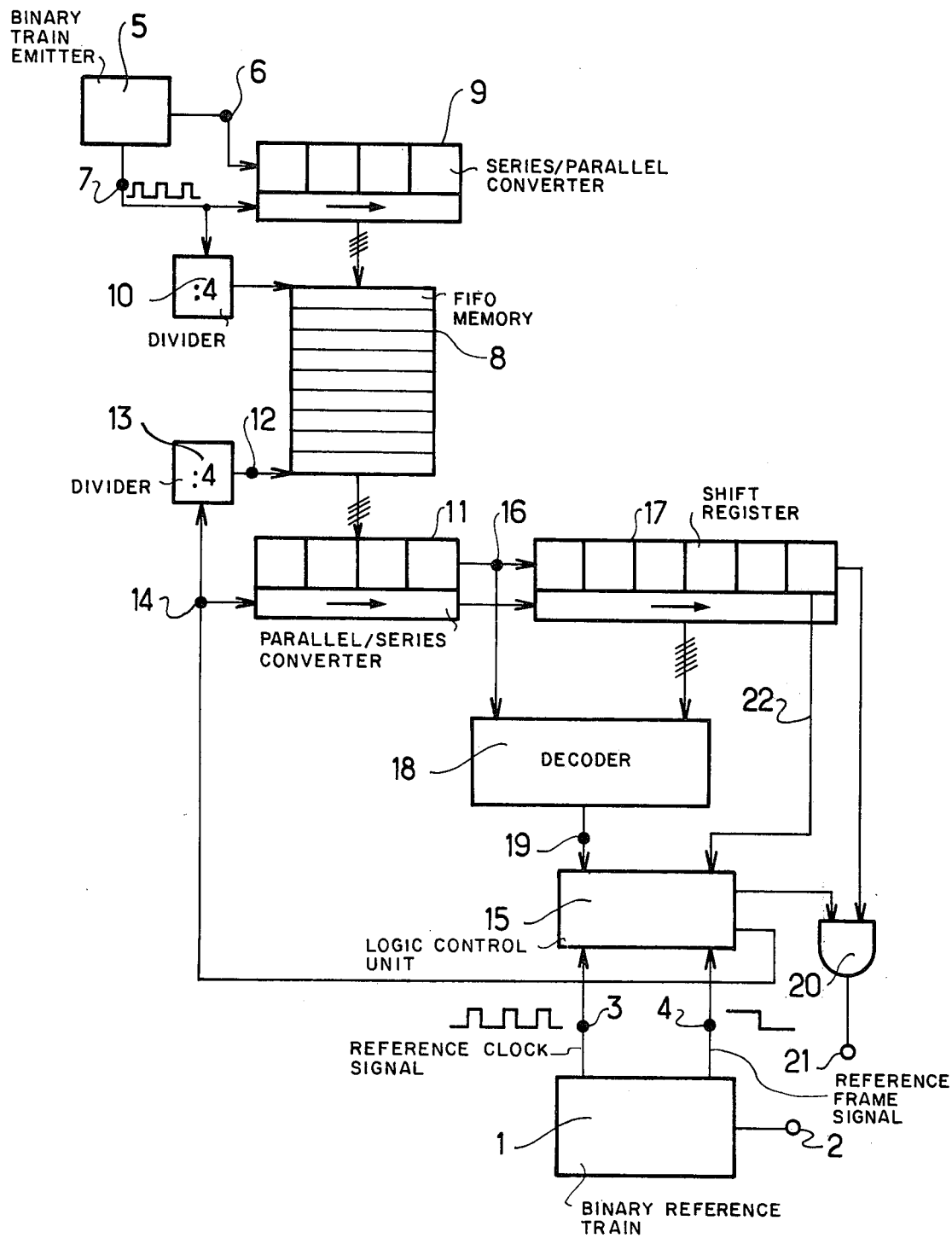

DEVICE FOR SYNCHRONIZING A BINARY DATA TRAIN IN RELATION TO A REFERENCE TRAIN

The invention comes within the field of digital electronics and concerns more particularly a device for the synchronizing of a binary data bit train in relation to another, the two trains having identical frequencies and being subdivided by locking "words" into frames having an identical length. Such a device is often called a frame synchronizing device and it is applicable more particularly to digital transmission of the PCM (pulse code modulation) type.

In PCM transmission, a binary data train is divided into frames having a certain length and certain positions which are well-determined by a particular combination of binary data (bits) that are marked within each frame. That combination of bits is called the "locking" and the positions of those bits are not available for the transmission of useful data.

With a view to the processing of the data contained in a succession of frames, an attempt is often made to synchronize one train in relation to another, for example when it is required to establish the identity of those two trains, or when it is required to distribute certain parts of a train to corresponding positions in another train. That synchronization of frames was, until now, effected by means of a memory in which the bits of a train have been written in successive call. The extracting of the bits from that memory is effected by means of a control device which sends out the addresses of the cells to be read as a function of the time difference between the respective beginnings of frames in the two trains.

An object of the present invention is to simplify the known control device; this is particularly appreciated when it is necessary to take into transmission errors, when decoding the frame locking word, and for satisfying standardized requirements concerning loss and recovery of the locking.

In a device for synchronizing one binary data train in relation to another, the two trains having identical frequencies and being subdivided by predetermined locking words into frames having identical lengths, the invention is characterized in that the train to be synchronized crosses firstly a circuit for series/parallel transformation, having $q$ bits, $q$ being 2, 3, ..., that the output of that circuit is connected to the input of a memory of the FIFO (=first in − first out) type having $q$ bits per cell, the writing speed of the memory corresponding to $1/q$ of the frequency, and the reading being controlled by a detector of the locking word for those trains at the output of the memory and by a signal indicating the synchronization of the two trains, and that the FIFO memory is followed by a parallel/series transformation circuit.

The essential particularity of a memory of the FIFO type is that a data input control device independent from the input control device is made available. Once they are inserted in the memory, the bits are conveyed according to an internal rhythm independent from the input and output rhythms. The internal rhythm is greater than the data insertion rhythm. The first bit which enters such a memory therefore crosses the latter very rapidly and is memorized at the nearest place to the output, the following bits being stacked behind. As soon as the first bit is extracted by an outside reading order for that memory, the stack of the remaining bits shifts by one place, and the second bit then occupies the last place.

According to one a particularity of an exemplary embodiment of the invention, the detector of the locking word is fed by a shift register whose capacity corresponds to the size of the locking word and which receives the series train leaving the parallel/series transformation circuit.

The invention will be described hereinbelow in greater detail with reference to the sole FIGURE of the accompanying drawing, which shows schematically an exemplary, preferred embodiment of the invention.

With reference to the drawing, a transmission channel for a first binary train A is symbolically shown by a unit 1, whose output 2 sends out the train. That channel sends out, moreover, at an output 3, a clock rhythm at which the bits cross through that channel. A binary signal, which shows the beginning of a, frame in the train A is available at an output 4.

In the device according to the invention, a frame synchronisation of that train A is effected in relation to another train B, which is sent out by a channel 5 to a terminal 6. Another terminal 7 of that channel sends out the binary rhythm of that channel.

It is compulsory for the two rhythms to be identical, although their phase relation, as well as the time difference between the two beginnings of the frames might have a random difference.

The essential element of the device according to the invention is constituted by a memory 8 of the FIFO type having in each cell four bits in parallel. The terminal 6 of the channel 5 feeds the memory 8 through a series/parallel transformation circuit 9 having four bits, which is constituted by a shift register. Shifting is effected at the rhythm of the train B, and the writing of the data in the memory is controlled by a rhythm which is derived from the original rhythm by means of a binary divided 10 divider by four.

The capacity of the FIFO memory 8 is a function of the maximum difference which is permitted between the two trains A and B (at 2 and 6, respectively). In general, the maximum difference is a complete frame.

Another transformation circuit 11, which receives, in parallel, four bits from the memory 8 when a control input 12 receives a pulse, is provided at the output of the memory 8.

The parallel/series transfromation circuit 11 is again constituted by a shift register whose shift speed is four times greater than the reading speed of the memory. For that purpose, another divider 13, dividing by four, is provided between the control input 12 of the memory 8 and a shift control input 14 of the memory 11. As will be seen hereinbelow, the input 14 receives pulses at the rhythm of the train A except when a frame locking word has been discovered and when, at the same time, the two trains are considered as non-synchronized. That conditioned rhythm is generated in a logic control unit 15, which will be explained later.

The bits leaving through a terminal 16 of the parallel/series transformation circuit 11 are applied subsequently to a shift register 17 whose shift speed is identical to the rhythm of the train A. The shift register 17 comprises six bistable elements whose outputs are connected to the inputs of a frame locking word decoder 18. The decoder is connected, moreover, to the terminal 16.

In the example chosen, the frame locking word comprises seven bits having a well determined configuration. When such a word enters the register 17, the decoder 18 observes coincidence with the predetermined configuration and sends out, at an ouput 19, a binary signal indicating the presence of such a word. The output 19 is connected to an input of the logic control unit 15. Two other inputs of that logic unit are connected to the outputs 3 and 4 respectively of the unit 1.

The control logic unit 15 controls a gate 20 which is situated between the output of the register 17 and an output 21 of the device. At the output 21, the train B, well synchronized with the train A, is presented as will be seen after the following explanation of the operation.

The train B is chopped by the divider 10 and the circuit 9 into groups of four bits. Cuttng up is effected in a random manner in relation to the beginning of the frame. The groups are stored one after another in the memory 8. At the time of the search for locking, the logic control unit 15 supplies the terminal 14 with a regular rhythm at the frequency of the train A. Consequently, the groups which have been written in the memory 8 leave successively by the circuit 11 and pass through the register 17. The gate 20 is blocked during the search for locking.

At each shift instant, the docoder 18 checks the combination of the bits and it sends out a signal to the logic control unit 15 on the discovery of a locking word. The unit 15 then checks the presence of the standardized criteria for effecting the locking. The locking will be considered as effected when the following conditions have been observed successively.

The presence of the locking word on the line 19, for the first time;

The presence of a particular bit on line 22, half a frame later; and

The presence of the locking word on the line 19, for the second time, half a frame later.

The logic control unit 15 comprises, for the checking of those criteria, counters and logic gates (not shown) and sends out an output permission signal to the gate 20 when these criteria are fulfilled and when the channel A indicates by its output 4 to the logic control unit 15 the beginning of a frame. The train B therefore leaves through the terminal 21, beginning by the frame locking word in synchronism with a frame locking word on the terminal 2 of the channel A. The gate 20 remains open unitl a loss of locking is discovered in the logic control unit. According to the standardized criteria, the frame locking is considered lost if the device detects three consecutive erroneous locking words.

The change to the loss of frame locking state causes the closing of the gate 20 and a further search for locking. It should be observed that the terminal 14 at the input of the parallel/series transformation circuit 11 receives regularly the rhythm of the train A, except in the interval between the discovery of a locking word in the register 17 according to the standardized criteria and the beginning of the next frame in the train A. During that time, the reading of the memory 8, the parallel/series transformation and the shift in the register 17 are blocked.

The device according to the invention is not limited to the example described hereinabove. It would be possible, for example to dispense with the two transformations in the circuits 9 and 11, using directly a FIFO memory in series. The device can also be adapted to other requirements and standards than those mentioned hereinabove. The invention applied to PCM digital terminals having thirty telephone channels. They enable the transfer of certain pieces of a PCM frame in a synchronous frame of another train. The application of the device according to the invention could even be considered when the frames are plesiochronous, that is, when they come from distinct clocks having an equal average frequency but being able to vary within specified limits. In view of the fact that an integer is stored in the memory, those limits can be fairly wide without there being any danger of loss of data.

We claim:

1. A device for synchronizing a binary data series train in relation to a reference train, the two trains having identical frequencies and being subdivided by predetermined locking bits into frames of identical lengths, the device comprising: a series/parallel-type first converter receiving the binary train in series and delivering this train, cut up randomly in words of $q$ bits ($q = 2, 3, \ldots$); a FIFO-type memory having $q$ bits per memory cell therein and receiving words at a regular writing speed of 1/q of the frequency; a parallel/series-type second converter receiving the output of said memory; a decoder for detecting the predetermined locking bits from an output train of said second converter; logic control means for receiving a pulse clock signal and frame synchronization signal of the reference train as well as the output of said decoder, for controlling the reading operation of said memory; and gate means for delivering the binary train to a synchronized output of the device.

2. The device as defined in claim 1, further comprising a shift register between said second converter and said decoder, which shift register receives an output series train of said second converter, and the capacity of which shift register corresponds to the number of the predetermined locking bits.

* * * * *